United States Patent [19]
Christensen et al.

[11] Patent Number: 5,491,687
[45] Date of Patent: Feb. 13, 1996

[54] METHOD AND SYSTEM IN A LOCAL AREA NETWORK SWITCH FOR DYNAMICALLY CHANGING OPERATING MODES

[75] Inventors: Kenneth J. Christensen, Apex; Michael S. Siegel, Raleigh; Norman C. Strole, Raleigh; Raymond L. Zeisz, Jr., Raleigh, all of N.C.

[73] Assignee: International Business Machines Corporation, Armonk, N.Y.

[21] Appl. No.: 314,111

[22] Filed: Sep. 28, 1994

[51] Int. Cl.⁶ .............................. H04L 29/14; H04L 12/46
[52] U.S. Cl. .................... 370/17; 370/85.13; 370/85.14; 395/182.02
[58] Field of Search .............................. 370/17, 60, 60.1, 370/94.1, 94.2, 85.13, 85.14; 395/182.02, 182.01; 340/825.5, 825.51, 825.06, 825.07, 825.05, 825.16

[56] References Cited

U.S. PATENT DOCUMENTS 5,079,764  1/1992  Orita et al. ........................ 370/85.14
5,088,090  2/1992  Yacoby ............................. 370/85.14
5,307,345  4/1994  Lozowiek et al. ................. 370/85.13
5,343,471  8/1994  Cassagnol ......................... 370/85.13

*Primary Examiner*—Wellington Chin
*Attorney, Agent, or Firm*—Joscelyn G. Cockburn; L. Bruce Terry; Andrew J. Dillon

[57] ABSTRACT

In a local area network switch, a first mode of operation is selected wherein frames are examined for errors as the frames are passed from a source port to a destination port. The LAN switch calculates an error rate as a function of a percentage of the frames passing through the local area network switch which have errors. In response to the error rate exceeding a high error rate threshold, the operating mode is switched to a second mode wherein the entire frame is buffered and examined for errors before the frame is passed from the source port to the destination port. Thereafter, the operating mode may be returned to the first mode if the error rate falls below a low error rate threshold. The local area network switch may also change operating modes as a function of a trend, which indicates a rate of increase or decrease of the error rate.

10 Claims, 6 Drawing Sheets

METHOD AND SYSTEM IN A LOCAL AREA NETWORK SWITCH FOR DYNAMICALLY CHANGING OPERATING MODES

BACKGROUND OF THE INVENTION

1. Technical Field

The present invention relates in general to an improved data communication and networking system, and in particular to an improved local area network (LAN) switch. Still more particularly, the present invention relates to an improved LAN switch having means for switching modes of operation in response to a rate at which frames having an error pass through such a LAN switch.

2. Description of the Related Art

LAN switches are known in the art of data communication and networking, and are used to provide data communication between LAN segments connected to multiple ports of the LAN switch. A "LAN segment" may be defined as a group of nodes where all nodes utilize the same Open Systems Interconnection (OSI) model physical layer.

To connect two LAN segments, the LAN switch enables a node in one LAN segment to communicate with a node in a different LAN segment. Typically, the LAN switch receives data from a node in one LAN segment and passes such data to another LAN segment which contains a destination node. To conserve data bandwidth in all LAN segments connected to the LAN switch, the LAN switch may only transfer data from one LAN segment to another LAN segment when a node in one LAN segment attempts to communicate with a node in a second LAN segment. Moreover, such a LAN switch may transfer data only to the LAN segment containing the destination node. Thus, communication between nodes in the same LAN segment may not be transferred to another LAN segment by the LAN switch, while information communicated between nodes belonging to different LAN segments is transferred from a source LAN segment to a destination LAN segment.

Some known LAN switches are able to learn the addresses of all nodes connected to each LAN segment connected to each port of the LAN switch. After learning the addresses of LAN nodes connected to each LAN segment, the LAN switch is able to selectively transfer data from one LAN segment to another LAN segment by analyzing the source address and destination address of the communication.

Known LAN switches provide two different modes of transferring data from one LAN segment to another LAN segment. In a first mode, the LAN switch passes a data frame through the switch without temporarily storing the entire frame within the switch. This mode of operation may be referred to as a "cut-through" mode. In the cut-through mode, the LAN switch analyzes the address information contained in a frame header, and immediately begins transferring data received from one LAN segment to the destination LAN segment as determined by such address information. The problem with the cut-through mode of operation is that frames containing erroneous data are transferred from one LAN segment to another LAN segment, and upon reception by a node in the destination LAN segment, the transfer frame is then discarded. By transferring a frame containing erroneous data, bandwidth has been wasted in the LAN switch, the destination LAN segment, and the data processing system connected to the destination node.

One partial solution to the problem of transferring frames having erroneous data is to operate the LAN switch in a second mode, which is called a "store-and-forward" mode. In the store-and-forward mode, each data frame is fully received and stored or buffered in the LAN switch. Then the frame is checked for errors before the data frame is forwarded to the destination LAN segment. If the data frame contains an error, the data frame is not transferred to the destination LAN segment. The disadvantage of the store-and-forward mode of operation is that this mode increases the delay from the time a source node transmits the data to the time the data is received by a destination node. This delay is caused by storing an entire frame within the LAN switch before transferring the frame to the destination LAN segment.

Data errors in a frame of data may occur for several reasons. For example, an electrical disturbance, which may be caused by an electric motor, may cause a data bit error in the data frame. Another cause of errors in a data frame is improperly installed network wiring. Yet another cause of erroneous data is a faulty workstation connected to a node in LAN segment. In many instances, sources of interference with network data are temporary. Because measures utilized to make network data more immune to interference usually degrades the performance of the network, it is desirable to implement such measures only while the source of interference is present.

For example, a LAN switch performs most efficiently in the cut-through mode when frames of data are error free. This is because network bandwidth in the LAN switch and destination LAN segment are not unnecessarily consumed by transferring frames having errors. Moreover, the delay caused by the LAN switch is minimized in the cut-through mode. However, if the LAN switch receives a frame to be transferred to a destination LAN, and such a frame has an error, the network system may operate most efficiently if the LAN switch is in the store-and-forward mode, where the LAN switch does not transfer a frame having an error to the destination LAN segment. By not transferring a frame having an error, the LAN switch conserves data bandwidth on the output port connected to the destination LAN segment, and conserves bandwidth in the destination LAN segment. However, when the LAN switch operates in the store-and-forward mode, the transfer of the frame from the source LAN segment to the destination LAN segment is delayed due to storing an entire frame and checking the frame for an error before transferring the frame to the destination LAN segment. Thus, the implementation of the store-and-forward degrades network efficiency to some extent in order to prevent a greater degradation in efficiency caused by transferring erroneous frames and consuming data bandwidth unnecessarily in the network system.

SUMMARY OF THE INVENTION

It is therefore one object of the present invention to provide an improved data communication and networking system.

It is another object of the present invention to provide an improved local area network (LAN) switch.

It is another object of the present invention to provide an improved LAN switch having means for switching modes of operation in response to a rate at which frames having an error pass through such a LAN switch.

It is still another object of the present invention to provide an improved LAN switch that automatically changes from a cut-through mode of operation to a store-and-forward mode of operation in response to the detection of a frame error rate which exceeds a predetermined threshold, and automatically changes back to cut-through operation in response to an error rate that is less than a predetermined threshold.

The foregoing objects are achieved as is now described. In a local area network switch, a first mode of operation is selected wherein frames are examined for errors as the frames are passed from a source port to a destination port. The LAN switch calculates an error rate as a function of a percentage of the frames passing through the local area network switch which include errors. In response to the error rate exceeding a high error rate threshold, the operating mode is switched to a second mode wherein each frame is buffered and examined for errors before the frame is passed from the source port to the destination port. Thereafter, the operating mode may be returned to the first mode if the error rate falls below a low error rate threshold. The local area network switch may also change operating modes as a function of a trend, wherein such a trend indicates a rate of increase or decrease of the error rate.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
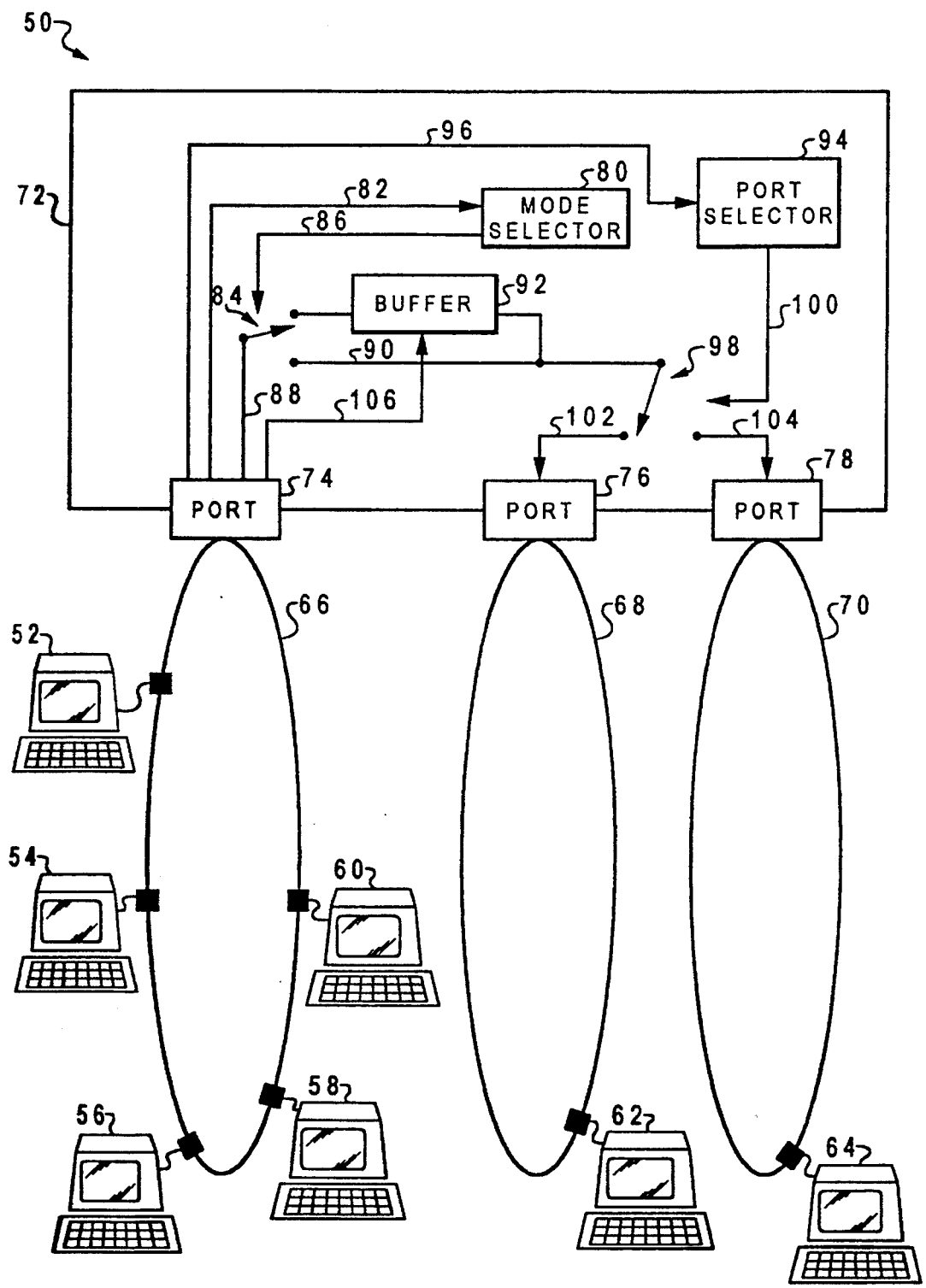
FIG. 1 is a high-level block diagram of a communications network system which includes a LAN switch in accordance with the method and system of the present invention.

With reference now to the figures and in particular with reference to FIG. 1, there is depicted a high-level block diagram of a communications network system which includes a LAN switch in accordance with the method and system of the present invention. The purpose of this block diagram is to illustrate the features of the invention and the basic principles of operation of a preferred embodiment. This block diagram is not intended to schematically represent particular modules of circuitry or any particular data or control paths.

As illustrated, communications network 50 includes data processing systems 52–64, which are each coupled to a LAN segment. Data processing systems 52–64 may be implemented utilizing any so-called "personal computer," such as the personal computer sold under the trademark "PS/2" which is manufactured and distributed by International Business Machines Corporation (IBM), of Armonk, N.Y.

In this example, three LAN segments are depicted: (1) LAN segment 66, which includes data processing systems 52, 54, 56, 58, and 60; (2) LAN segment 68, which includes data processing system 62; and (3) LAN segment 70, which includes data processing system 64. LAN segments 66–70 may include varying numbers of data processing systems, where the number of data processing systems connected to a LAN segment is limited only by practical limitations and the design specifications of the particular LAN segment. LAN segments 66–70 may be implemented by standard networks such as Token Ring, Ethernet, Fiber Distributed Data Interface (FDDI), or the like. In the present example, LAN segments 66–70 are Token Ring LAN segments (both shared media and full-duplex).

LAN segments 66 through 70 are coupled to LAN switch 72 at ports 74 through 78, respectively. Port 74, which is similar to ports 76 and 78, performs several functions. Namely, port 74 provides the Media Access Control (MAC) and Physical Layer (PHY) necessary to couple to and communicate with LAN segment 66. Additionally, port 74 maintains current port statistics including the number of good and bad frames passing through port 74, and the operational status of port 74. "Bad" frames are those frames which include a number of errors which exceeds a predetermined level. Port 74 also maintains address tables which list the address of nodes connected to other LAN segments that are connected to other ports of LAN switch 72. Along with maintaining such address tables, port 74 also includes circuitry for determining and selecting a destination port. Port 74 also includes buffers for buffering input and/or output frames. Buffering may be needed when a destination port is "busy" or when frames arrive at an aggregate rate that exceeds the capacity of the target port. Finally, port 74 provides interface logic to the "switch fabric." The switch fabric refers to the circuitry which carries data from one port to another. Such switch fabric may be a high-speed bus or a cross-bar switch (e.g., similar to some telephone switches).

LAN switch 72 provides at least two modes of operation in which data is transferred from one port to another. In the present invention, the mode of operation is determined by mode selector 80, in response to data regarding the number of frame errors sent from port 74 to mode selector 80 via signal line 82. The determination of whether or not a frame contains an error, and the detailed operation of mode selector 80 are discussed in detail below. Additionally, the mode of operation may be determined by mode selector 80 in response to a trend in the frame error rate.

Once mode selector 80 has determined a mode of operation, mode selector 80 controls the process with which data is handled within LAN switch 72 by controlling switch 84 via signal line 86. Switch 84 determines whether or not data from data path 88 is transmitted to another port via data path 90 or via buffer 92. If data is transmitted from port 74 through data path 88 to another port via data path 90, the LAN switch is operating in a cut-through mode. Alternatively, if data from port 74 is transmitted through data path 88 into buffer 92 before being transmitted to another port, LAN switch 72 is operating in a store-and-forward mode. Thus, the mode of operation is determined by switch 84 which is controlled by mode selector 80, and mode selector 80 responds to information received from port 74 concerning error rates within frames of data received by port 74 from a node in LAN segment 66.

Port selector 94 is utilized to select a destination port based upon information received from port 74 via signal line 96. As illustrated in FIG. 1, information transmitted on data path 90, or through buffer 92, is connected to either port 76 or port 78 by switch 98. Switch 98 is controlled by port selector 94 as indicated by signal line 100.

For example, if data received at port 74 is intended for data processing system 62, port selector 94 causes switch 98 to complete a path from data path 90 to port 76 through data path 102. Similarly, if data received by port 74 is intended for data processing system 64, port selector 94 causes switch 98 to connect data path 90 with data path 104, which permits data to be received at port 78 and placed on LAN segment 70. Port selector 94 is typically responsible for maintaining address tables which contain the addresses of all nodes and their associated LAN segments. The information passed from port 74 to port selector 94 via signal line 96 may include address information taken from a header in the data frame received by port 74. While the function of maintaining address tables is illustrated at block 94, this function may be carried out in the ports 74–78 of LAN switch 72.

Port 74 is also coupled to buffer 92 via signal line 106. Signals received by buffer 92 from port 74 via signal line 106 may be utilized to clear data temporarily stored in buffer 92. Data within buffer 92 may be deleted if it is determined within port 74 that the frame of data within buffer 92 contains an error.

With reference now to FIGS. 2A, 2B, 2C and 2D, there is depicted a high-level flowchart which illustrates the process of determining a mode of operation in a LAN switch according to the method and system of the present invention. As illustrated, the process begins at block 200, and thereafter passes to block 202. Block 202 depicts the process of initially setting the LAN switch to operate in the cut-through mode. The cut-through mode is selected initially because this is the most efficient mode of operation for the LAN switch. The cut-through mode transfers data from one port to a destination port with the least amount of delay.

Next, a frame is examined for errors as such a frame passes through the LAN switch from a source LAN segment to a destination LAN segment, as illustrated at block 204. Such frame errors may include frames with incorrect FRAME CHECK SEQUENCES (e.g., caused by random bits that were changed by electrical noise) and frame fragments on an ethernet LAN segment (e.g., a fragment caused by a collision between two data frames). Frames that have "burst-five" errors may also be located.

Thereafter, the "reset_flag" is set to "true," as depicted at block 206. Such a "reset_flag" is used to determine whether or not the process is in the first sampling period when the mode is set to cut-through operation. If the process is in the first sampling period, the trend analysis cannot be calculated, and is consequently omitted.

Next, the LAN switch determines whether or not a frame error has been detected, as illustrated at block 208. Alternatively, the LAN switch determines if the number of errors detected in a frame exceeds a preselected number, where such a number may be zero. If a frame error has not been detected, the LAN switch continues to examine subsequent frames for errors, as depicted by the "NO" branch from block 208 to block 204. However, if a frame error is detected, a sample period timer is started, as depicted at block 210. Next, the variables "total_frame_count" and "error_frame_count" are set to zero, as illustrated at block 212.

Once the sample period timer has been started, and selected variables have been initialized, the LAN switch examines a frame for errors as that frame passes through the LAN switch from a source LAN segment to a destination LAN segment, as depicted at block 214. The process of examining frames is similar to that process discussed above with reference to block 204. After examining a frame, the variable "total_frame_count" is incremented, as illustrated at block 216.

Next, the LAN switch determines whether or not a frame error has been detected as a result of the frame examination, as depicted at block 218. If a frame error has been detected, the variable "error_frame_count" is incremented, as illustrated at block 220. Thereafter, processing continues at block 222. Processing also continues at block 222 if a frame error was not detected.

As depicted at block 222, the LAN switch determines whether or not the sample period has expired. If the sample period has not expired, the process continues to examine a subsequent frame as depicted at block 214. However, if the sample period has expired, the process passes, via off page connector "D," to block 224 in FIG. 2B. Thus, after the sample period expires, the process enters the portion of the flowchart in FIG. 2B, which illustrates the determination of whether or not to switch from the "cut-through" mode to a "store-and-forward" mode.

As illustrated at block 224, the LAN switch calculates an "error rate." One method of calculating such an error rate is to divide the number of frames that contain an error condition by the total number of frames that have been passed through the LAN switch. Next, the "trend" is calculated by subtracting the previous error rate from the current error rate, as depicted at block 226. The trend indicates whether the error rate is increasing or decreasing, and also indicates the rate of increase or decrease. Thereafter, the current error rate is stored in the variable "error_last," as illustrated at block 228.

Next, the LAN switch determines whether or not the error rate is less than a preselected lower error rate threshold, as depicted at block 230. If the current error is less than a lower error rate threshold, the process passes, via a off page connector "C," to block 204 in FIG. 2A, where the process continues to examine frames for errors.

If the error rate is greater than a lower error rate threshold, the LAN switch determines whether or not the error rate is greater than a preselected high error rate threshold, as illustrated at block 232. If the error rate is greater than the high error rate threshold, the LAN switch sets the "reset_flag" to "false," as depicted at block 234. Thereafter, the process passes, via off page connector "A," to block 236 in FIG. 2C, wherein the LAN switch is set to operate in the "store-and-forward" mode as a result of the error rate exceeding the high error rate threshold at block 232.

Referring again to block 232, if the error rate is less than the high error rate threshold, the LAN switch examines the trend, as depicted at block 238. However, if the "reset_flag" is "true," trend information is not available, and the process passes to block 240. But, if the "reset_flag" is "false," and the trend is greater than a high trend threshold, the process passes from block 238 to block 236 in FIG. 2C, where the LAN switch mode is changed to operate in the "store-and-forward" mode.

Figure 2A:
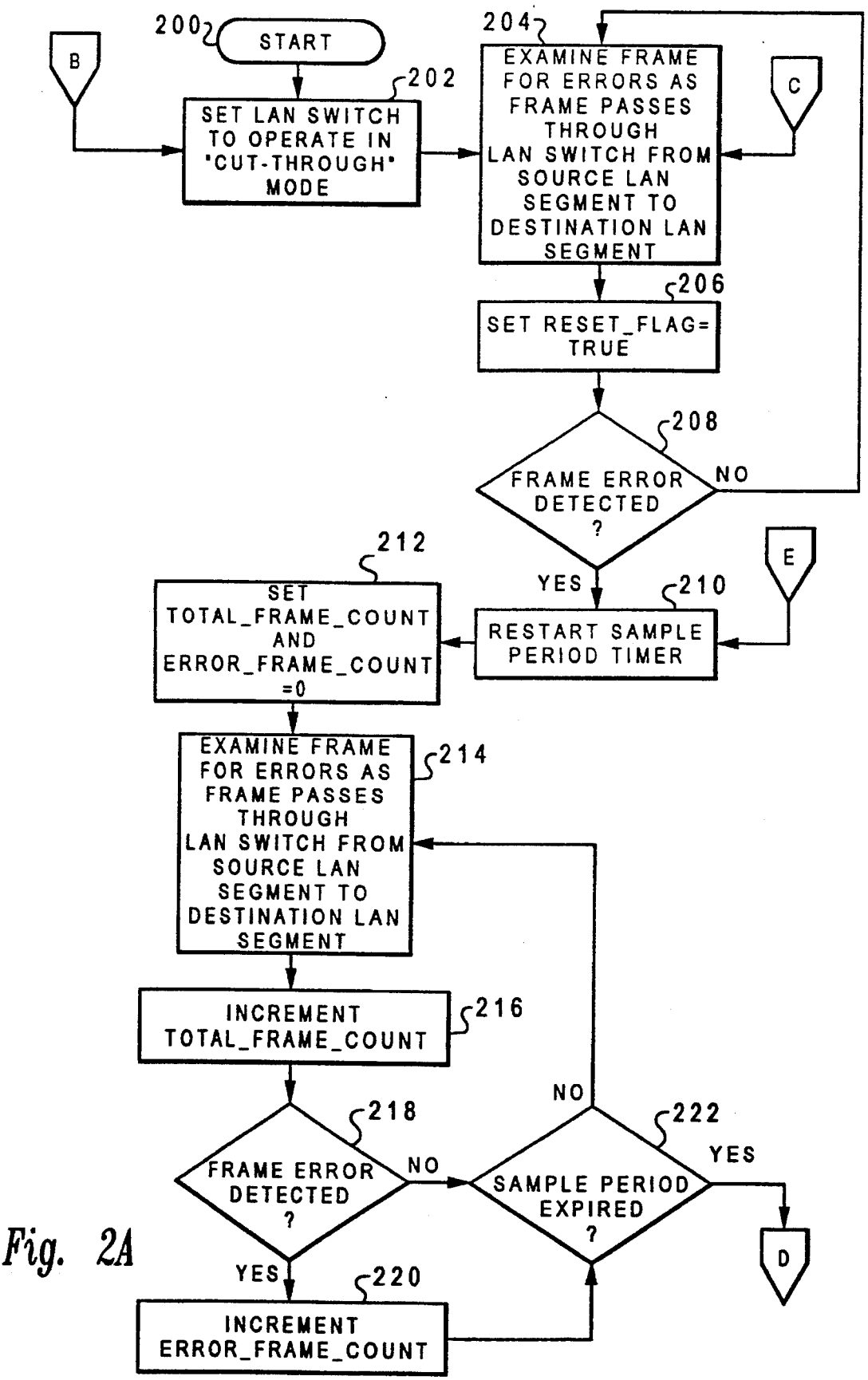
FIGS. 2A, 2B, 2C and 2D form a high-level flowchart which illustrates the process of dynamically switching modes of operation of a LAN switch in response to the detection of frame errors in accordance with the method and system of the present invention.
Figure 2B:
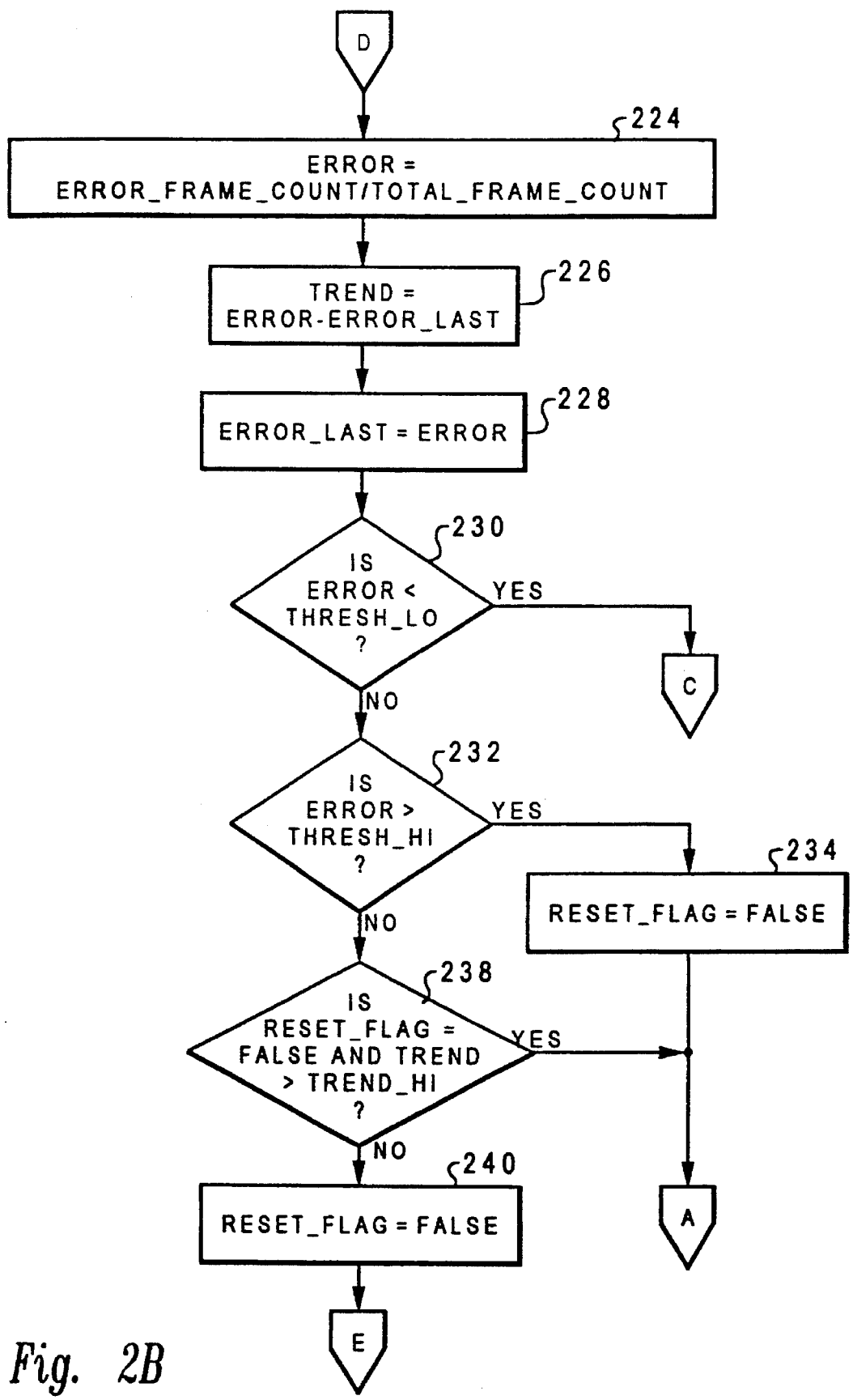

If the "reset_flag" is "true," or if the trend is less than the high trend threshold, the LAN switch sets the "reset_flag" to "false" and continues processing, via off page connecter "E," at block 210 in FIG. 2A. At block 210, the sample period timer is restarted, and the process continues to examine subsequent frames for errors.

Figure 2C:
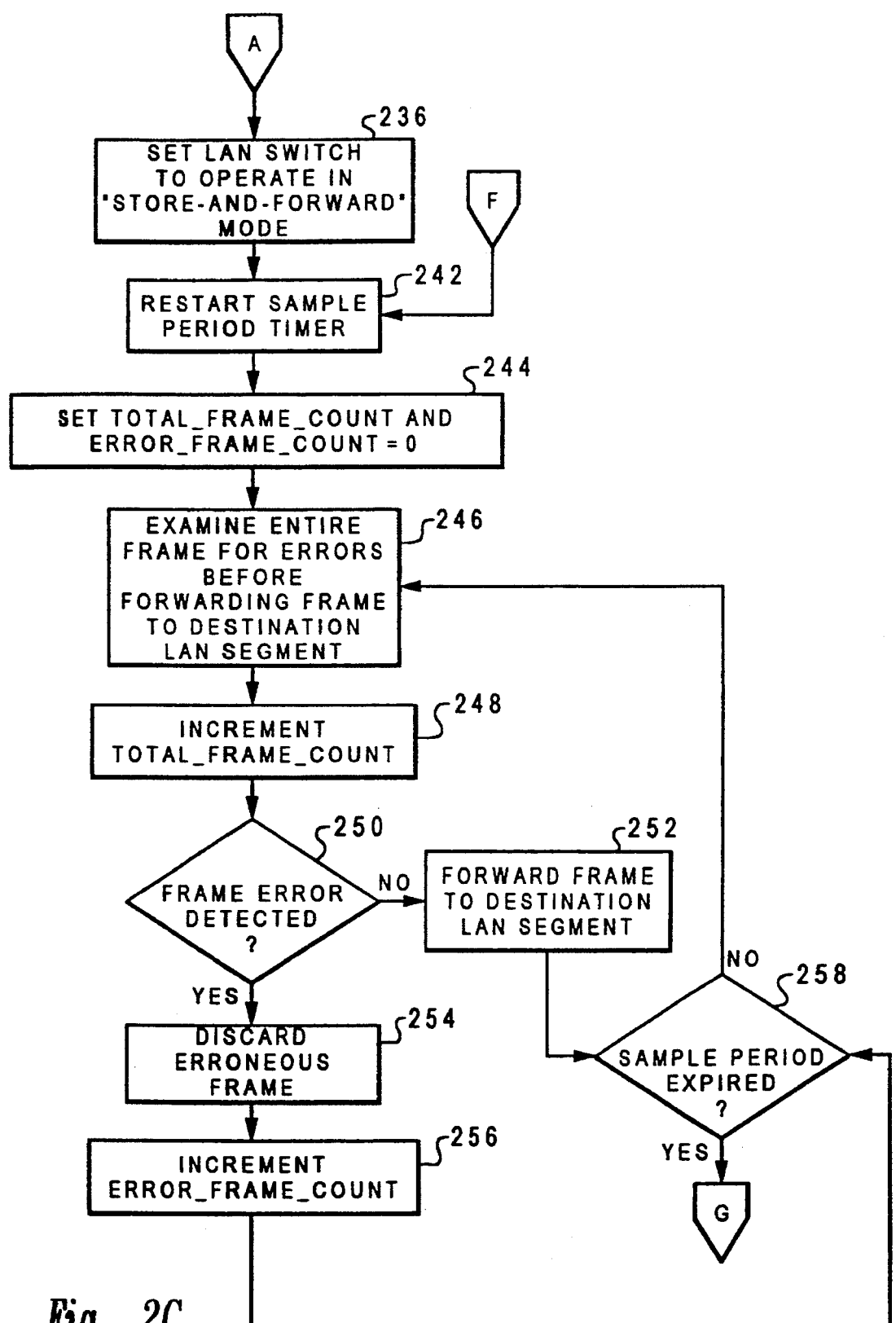

Once the LAN switch has made the decision to operate in the "store-and-forward" mode, LAN switch processing enters the flowchart depicted in FIG. 2C, where, as illustrated at block 236, the LAN switch is set in the store-and-forward" mode. Thereafter, the sample period timer is restarted, as depicted at block 242. Next, the variables "total_frame_count" and "error_frame_count" are set to "zero", as illustrated at block 244.

Next, the LAN switch examines an entire frame of data for errors before forwarding such a frame to a destination LAN segment, as depicted at block 246. Thus, the frame is temporarily stored in a buffer, such as buffer 92 of FIG. 1, before the frame may be forwarded to a destination LAN segment. Thereafter, the LAN switch increments the variable "total_frame_count," as illustrated at block 248.

After an entire frame has been examined for errors and stored in a buffer, the LAN switch determines whether or not the frame contains an error, as depicted at block 250. If a frame error was not detected, the LAN switch forwards the frame to the destination LAN segment, as illustrated at block 252. However, if a frame error was detected, the LAN switch discards the erroneous frame (i.e., clears the frame in the buffer), as depicted at block 254.

After discarding the erroneous frame, the process increments the "error_frame_count," as illustrated at block 256.

Whether the frame was forwarded to the destination LAN segment, or whether the erroneous frame was discarded, the LAN switch then determines whether or not the sample period has expired, as depicted at block 258. If the sample period has not expired, the LAN switch continues processing at block 246. If the sample period has expired, LAN switch processing passes, via off page connector "G," to FIG. 2D, which illustrates the portion of the flowchart which illustrates the determination of whether or not to switch back to the "cut-through" mode.

Figure 2D:
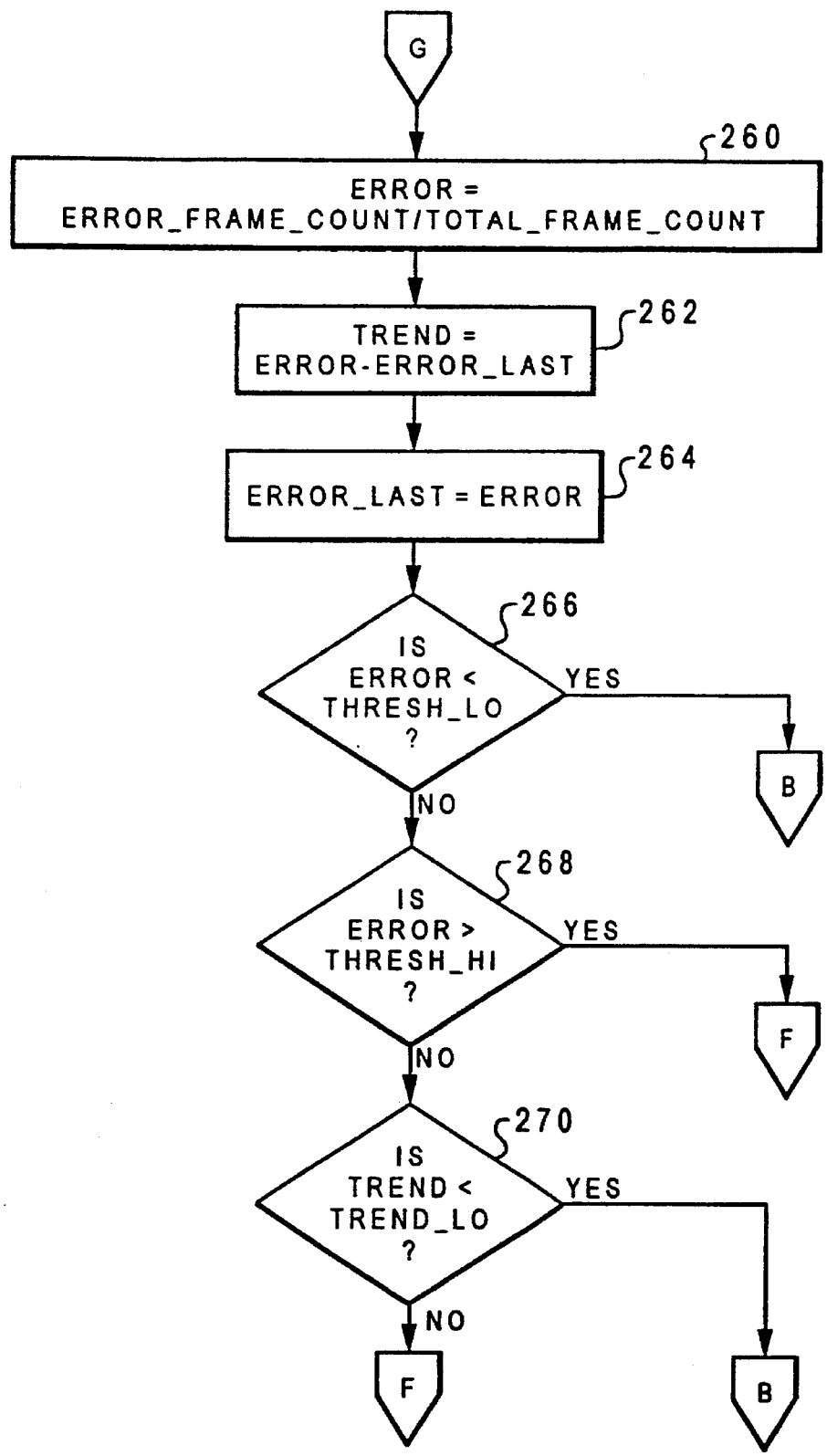

With reference now to FIG. 2D, the LAN switch calculates the error rate, as illustrated at block 260. The error rate may be calculated by dividing the number of frames that contain an error by the total number of frames that have been passed through the LAN switch (i.e., "total_frame_count"). Thereafter, the process calculates the trend, as depicted at block 262. Next, the process stores the current error rate in the variable "error_last," as illustrated at block 264.

After performing the calculations described above, the LAN switch determines whether or not the error rate is less than the selected low error rate threshold, as depicted at block 266. If the error rate is less than the low error rate threshold, the process passes to block 202 in FIG. 2A, via off page connector "B," wherein the LAN switch is set to operate in the "cut-through" mode. However, if the error rate exceeds the low error rate threshold, the LAN switch determines whether or not the error rate is greater than the high error rate threshold, as illustrated at block 268. If the error rate is greater than the high error rate threshold, processing continues at block 242 in FIG. 2C, via off page connector "F."

If, however, the error rate is less than the high error rate threshold, and greater than the low error rate threshold, the LAN switch determines whether or not the trend is less than the low trend threshold, as depicted at block 270. If the trend is less than the low trend threshold, processing continues at block 202 in FIG. 2A, via off page connector "B," wherein the LAN switch is set to operate in the "cut-through" mode. However, if the trend is greater than the low trend threshold, processing continues at block 242 in FIG. 2C, via off page connector "F," wherein the process starts a new sample period and continues to examine frames for errors.

In an alternative embodiment, the LAN switch may change modes of operation based only upon an error rate in relation to an error rate threshold, without considering the trend of the error rate. Such operation may be carried out in a manner similar to the process flowcharted in FIGS. 2A, 2B, 2C, and 2D, and in a manner depicted in FIG. 3, which is described below.

In another embodiment, the sample period timer may be eliminated and replaced by a frame counter. In such an embodiment, the frame error rate may be calculated by dividing a fixed aggregate frame count, which begins with the first frame error, by the number of frames that contain an error condition (see reference numerals 210 and 242). Therefore, the sample period in this embodiment expires upon reaching a predetermined frame count (see reference numerals 222 and 258).

Figure 3:
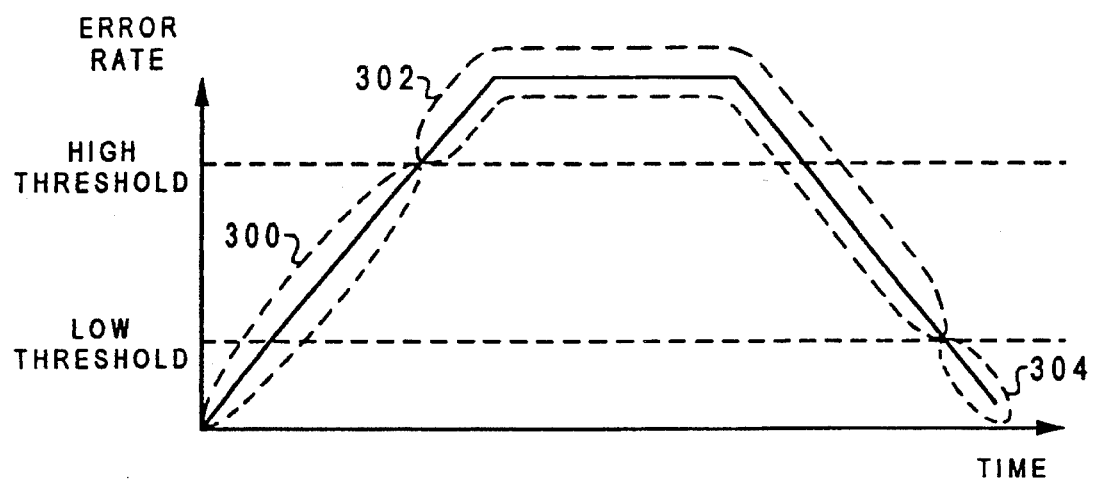
FIG. 3 depicts a graph which illustrates when the LAN switch changes modes of operation with reference to a particular error rate over a period of time in accordance with the method and system of the present invention.

With reference now to FIG. 3, there is depicted a graph which illustrates when the LAN switch changes modes of operation with reference to a particular error rate over a period of time. Without regard to the error rate trend in accordance with the method and system of the present invention. At power up, the LAN switch is initially set to the "cut-through" mode, and continues in the cut-through mode until the error rate exceeds a high error rate threshold as illustrated at the portion of the curve at reference numeral 300. If the error rate exceeds the high error rate threshold, the LAN switch is placed in the "store-and-forward" mode, and remains in the store-and-forward mode until the error rate drops below a low error rate threshold, as illustrated at the portion of the curve at reference numeral 302. After the error rate has dropped below the low error rate threshold, the LAN switch is one again set to operate in the cut-through mode, as depicted at reference numeral 304.

Figure 4:
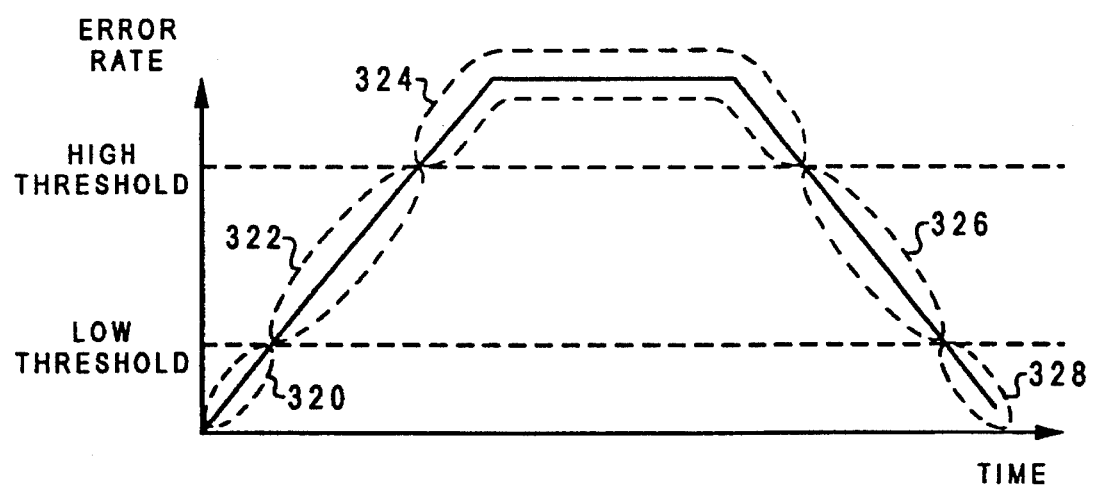
FIG. 4 is a graph which illustrates how the decision is made to alter LAN switch modes when trend analysis is included in accordance with the method and system of the present invention.

With reference now to FIG. 4, there is depicted a graph which illustrates how the decision is made to switch modes when trend analysis is included in accordance with the method and system of the present invention. At time zero, the LAN switch is initially placed in the cut-through mode, as illustrated at reference numeral 320. After the error rate exceeds the low error rate threshold, but before the error rate exceeds the high error rate threshold, the LAN switch remains in the cut-through mode unless the trend exceeds the high-trend threshold (i.e., the error rate is increasing faster than a preselected rate), as illustrated at reference numeral 322. After the error rate has exceeded the high error rate threshold, the LAN switch is placed in the store-and-forward mode, as depicted at reference numeral 324. While the error rate exceeds the high error rate threshold, trend analysis continues, but will not affect the decision to switch back to the cut-through mode.

If the error rate then falls below the high error rate threshold, the process remains in the store-and-forward mode, unless the trend is less than the low trend threshold (i.e., the error rate is falling at a rate which exceeds the low trend threshold), as illustrated at reference numeral 326. Thereafter, if the error rate falls below the low error rate threshold, the LAN switch is placed in the cutthrough mode, as depicted at reference numeral 328. Since the trend analysis does not affect the decision to switch modes when the error rate is below the low error rate threshold, the LAN switch is not required to compute the trend during the time when the error rate is below the low error rate threshold.

While the present invention has been disclosed as a LAN switch, those persons skilled in the art should recognize that such a LAN switch may also include other packet-type communication switches which are designed to selectively transfer data from one portion of a data communications system to another portion of such a data communication system.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for changing operating modes of a local area network switch, wherein said local area network switch includes a plurality of ports connected to a plurality of local area network segments, and wherein said local area network switch selectively transfers frames from a source port to a destination port, said method comprising the steps of:

operating said local area network switch in a first mode of operation wherein said frames are examined for errors as said frames are transferred from said source port to said destination port within said local area network switch;

calculating an error rate as a function of a percentage of said frames having errors; and switching said local area network switch to a second mode of operation if said error rate exceeds a high error rate threshold, wherein said second mode of operation includes the steps of examining each frame for errors within said local area network switch, and transferring said frame from said source port to said destination port only after completely examining said frame and determining that a number of errors within said frame is equal to or below a preselected number.

2. The method in a local area network switch according to claim 1 further including the step of returning said local area network switch to said first mode of operation if said error rate falls below a low error rate threshold, wherein said local area network switch operates in a selected mode in response to said error rate and said low and high error rate thresholds.

3. The method in a local area network switch according to claim 1 wherein said step of operating in a first mode of operation wherein said frames are examined for errors as said frames are transferred from a source port to a destination port within said local area network switch includes operating in a first mode of operation wherein said frames are examined for frame check sequence errors as said frames are transferred from a source port to a destination port within said local area network switch.

4. The method in a local area network switch according to claim 1 wherein said second mode of operation includes the steps of:

storing said frame in a buffer until said frame is examined for said errors;

transferring said frame from said buffer to said destination port within said local area network switch in response to determining that said number of errors within said frame is equal to or below said preselected number; and discarding said frame in response to determining that said number of errors within said frame is above said preselected number.

5. The method in a local area network switch according to claim 1 further including the steps of:

calculating a trend, wherein said trend indicates a rate of increase or decrease of said error rate;

switching to said second mode of operation if said error rate is above said low error rate threshold, and said trend exceeds a rising trend threshold; and returning to said first mode if said error rate is below a high error rate threshold, and said trend exceeds a falling trend threshold.

6. A local area network switch including a plurality of ports for connecting to a plurality of local area network segments, wherein said local area network switch includes means for selectively transferring frames from a source port to a destination port, said local area network switch comprising:

means for operating said local area network switch in a first mode of operation including means for examining said frames for errors as said frames are transferred from said source port to said destination port within said local area network switch;

means for calculating an error rate as a function of a percentage of said frames having errors; and means for switching said local area network switch to a second mode of operation if said error rate exceeds a high error rate threshold;

means for operating said local area network switch in a second mode of operation including means for examining each frame for errors within said local area network switch, means for transferring said frame from said source port to said destination port, and means for determining that a number of errors within said frame is equal to or below a preselected number, wherein said frames are transferred from said source port to said destination port only after said frame has been completely examined and a number of errors within said frame is equal to or below a preselected number.

7. The local area network switch according to claim 6 further including means for returning said local area network switch to said first mode of operation if said error rate falls below a low error rate threshold, wherein said local area network switch operates in a selected mode in response to said error rate and said low and high error rate thresholds.

8. The local area network switch according to claim 6 wherein said means for means for examining said frames for errors includes means for examining said frames for frame check sequence errors.

9. The local area network switch according to claim 6 wherein said means for operating said local area network switch in a second mode of operation includes:

means for storing said frame in a buffer until said frame is examined for said errors;

means for transferring said frame from said buffer to said destination port within said local area network switch in response to a determination that said number of errors within said frame is equal to or below said preselected number; and means for discarding said frame in response to a determination that said number of errors within said frame is above said preselected number.

10. The local area network switch according to claim 6 further including:

means for calculating a trend, wherein said trend indicates a rate of increase or decrease of said error rate;

means for switching to said second mode of operation if said error rate is above said low error rate threshold, and said trend exceeds a rising trend threshold; and means for returning to said first mode if said error rate is below a high error rate threshold, and said trend exceeds a falling trend threshold.

* * * * *